US011859156B2

(12) United States Patent
Fuller et al.

(10) Patent No.: US 11,859,156 B2
(45) **Date of Patent: *Jan. 2, 2024**

(54) DETERGENT COMPOSITION

(71) Applicant: The Procter & Gamble Company, Cincinnati, OH (US)

(72) Inventors: Linsey Sarah Fuller, Newcastle upon Tyne (GB); Robert William John Sterry, Newcastle upon Tyne (GB)

(73) Assignee: The Procter & Gamble Company, Cincinnati, OH (US)

( * ) Notice: Subject to any disclaimer, the term of this patent is extended or adjusted under 35 U.S.C. 154(b) by 51 days.

This patent is subject to a terminal disclaimer.

(21) Appl. No.: 17/161,713

(22) Filed: Jan. 29, 2021

(65) Prior Publication Data

US 2021/0269749 A1 Sep. 2, 2021

(30) Foreign Application Priority Data

Feb. 4, 2020 (EP) .................................... 20155441

(51) Int. Cl.

| | |
|---|---|
| ***C11D 3/30*** | (2006.01) |
| ***C11D 3/39*** | (2006.01) |
| ***C11D 3/395*** | (2006.01) |
| ***C11D 3/37*** | (2006.01) |
| ***C11D 1/34*** | (2006.01) |
| ***C11D 3/10*** | (2006.01) |
| ***C11D 3/386*** | (2006.01) |
| ***C11D 1/66*** | (2006.01) |
| ***C11D 3/36*** | (2006.01) |
| ***C11D 17/04*** | (2006.01) |
| *C11D 11/00* | (2006.01) |

(52) U.S. Cl.

CPC .............. *C11D 3/3792* (2013.01); *C11D 1/34* (2013.01); *C11D 1/66* (2013.01); *C11D 3/10* (2013.01); *C11D 3/361* (2013.01); *C11D 3/3723* (2013.01); *C11D 3/38609* (2013.01); *C11D 3/38618* (2013.01); *C11D 3/3902* (2013.01); *C11D 3/3905* (2013.01); *C11D 3/3951* (2013.01); *C11D 17/043* (2013.01); *C11D 11/0029* (2013.01); *C11D 11/0035* (2013.01)

(58) Field of Classification Search

CPC ..... C11D 1/66; C11D 3/3723; C11D 3/38609; C11D 3/38618; C11D 3/3902; C11D 3/3905; C11D 3/361; C11D 17/043

USPC ....... 510/220, 221, 226, 229, 372, 375, 376, 510/439, 477, 499, 392, 393

See application file for complete search history.

(56) References Cited

U.S. PATENT DOCUMENTS 6,004,922 A 12/1999 Watson
9,540,595 B2 1/2017 Hulskotter et al.

FOREIGN PATENT DOCUMENTS

WO 9742294 A1 11/1997

OTHER PUBLICATIONS

PCT Search Report and Written Opinion for PCT/US2021/015598 dated Jun. 1, 2021, 14 pages.
Extended European Search Report and Search Opinion; Application No. 20155441.7; dated Jul. 21, 2020; 9 pages.

*Primary Examiner* — Gregory R Delcotto
(74) *Attorney, Agent, or Firm* — Carolyn S. Powell

(57) ABSTRACT

An automatic dishwashing detergent composition can include an alkoxylated polyalkyleneimine said alkoxylated polyalkyleneimine including a polyalkyleneimine backbone, alkoxy chains and quaternization groups wherein the alkoxylated polyalkyleneimine has a degree of quaternization of from about 40% to about 98% and wherein the polyalkyleneimine backbone represents from about 1% to about 40% by weight of the alkoxylated polyalkyleneimine and the alkoxy chains represent from about 60% to about 99% by weight of the alkoxylated polyalkyleneimine; percarbonate bleach; an amylase and a protease; and wherein the composition is free of bleach activator and bleach catalyst, or wherein the composition is free of bleach activator and includes manganese bleach catalyst.

7 Claims, No Drawings

DETERGENT COMPOSITION

TECHNICAL FIELD

The present invention is in the field of detergents. In particular, it relates to an automatic dishwashing detergent composition comprising an alkoxylated polyalkyleneimine. The composition provides good removal of bleachable stains coupled with removal of enzymatic soils.

BACKGROUND OF THE INVENTION

The automatic dishwashing detergent formulator is continuously looking for ways to improve the performance of detergents. Items placed in a dishwasher to be washed are usually stained with different kinds of stains. Tea and coffee stains are particularly difficult to remove. The problem is more acute when the detergent is phosphate free.

The use of polyalkyleneimines in cleaning compositions is known. EP 2662436 A1 discloses a dishwashing detergent composition comprising a specific polyalkyleneimine, and a bleach system comprising bleach and a bleach enhancer wherein the bleach enhancer comprises a bleach catalyst and a bleach activator.

The objective of the present invention is to provide an automatic dishwashing composition providing good bleachable stain removal coupled with good removal of enzymatic soils.

SUMMARY OF THE INVENTION

According to a first aspect of the invention, there is provided an automatic dishwashing detergent composition. The composition comprises an alkoxylated polyalkyleneimine, percarbonate bleach and an enzymatic system comprising amylase and protease. The composition is free of bleach activator and bleach catalyst, or the composition is free of bleach activator and comprises manganese bleach catalyst. The alkoxylated polyalkyleneimine has a polyalkyleneimine backbone and alkoxy chains. The alkoxylated polyalkyleneimine of the composition of the invention is sometimes herein referred to as "the polyalkyleneimine". The term "alkoxylated polyalkyleneimine" as used herein encompasses any alkoxylated alkyleneimine comprising two or more alkyleneimine repeating units. Preferably the polyalkyleneimine is polyethyleneimine.

The alkoxylated polyalkyleneimine has a degree of quaternization of at least 5%, preferably from about 20% to about 98%, more preferably from about 40% to about 98% and especially from about 50% to about 98% by weight of the polyalkyleneimine. In addition to the bleaching performance, the degree of quaternization seems to help with the stability of the polyalkyleneimine in the composition of the invention, in particular it seems to protect the polyalkyleneimine from oxidizing agents such as bleach, contributing to the stability on storage of the composition.

By "degree of quaternization" is herein meant the percentage of amino groups that are permanently quaternized (as opposite to protonated).

In the alkoxylated polyalkyleneimine of the composition of the invention:

i) the polyalkyleneimine backbone represents from 0.5% to 40%, preferably from 1% to 30% and especially from 2% to 20% by weight of the alkoxylated polyalkyleneimine; and ii) the alkoxy chains represent from 60% to 99%, preferably from 50% to about 95%, more preferably from 60% to 90% by weight of the alkoxylated polyalkyleneimine.

The percentages of the polyalkyleneimine backbone and the alkoxy chains are calculated with respect to the quaternized alkoxylated polyalkyleneimine, i.e. including the quaternization groups.

The composition of the invention also comprises percarbonate bleach and it is free of bleach activator and bleach catalyst, or wherein the composition is free of bleach activator and comprises manganese bleach catalyst. By "free of bleach activator and bleach catalyst" is herein understood that the composition comprises less than 0.001%, preferably less than 0.0001% by weight of the composition of bleach activator and bleach catalyst. The polyaklyleneimine of the invention in combination with bleach and an enzymatic system, in the absence of bleach activator and bleach catalyst provides outstanding bleaching and at the same time outstanding enzymatic stain removal benefits. Without being bound by theory, it is believed that the polyalkyleneimine can form complexes with bleach species generated from the bleach, the complexes have such a charge and steric configuration that are driven to the stained surfaces, thus the bleach species can work on removing the stains in situ instead of in the bulk of the cleaning solution, that is where usually takes place. This mechanism seems to be extremely efficient for stain removal, especially for the removal of tea and coffee stains. The relationship between the weight of the polyalkyleneimine backbone and the weight of the alkoxy chains of the alkoxylated polyalkyleneimine and the degree of quaternization of the polyalkyleneimine seem to be critical for the formation of bleach species/polyalkyleneimine complexes that would selectively go to bleachable stains improving the efficacy of the bleach system.

Preferably, the alkoxy chains have an average of from about 1 to about 50, more preferably from about 1 to about 10, more preferably from about 2 to about 40, more preferably from about 3 to about 30 and especially from about 3 to about 20 and even more especially from about 4 to about 15 alkoxy units preferably ethoxy units. Preferably the polyalkyleneimine is polyethyleneimine. Compositions comprising polyethyleneimines having an average of from about 1 to about 50, preferably from about 2 to about 40, more preferably from about 3 to about 30 and especially from about 3 to about 20 and even more especially from about 4 to about 15 ethoxy units have been found to provide outstanding bleaching benefits.

Preferably, the alkoxy chains have an average of from about 0 to 30, more preferably from 0 to 10, more preferably from about 1 to about 12, especially from about 1 to about 10 and even more especially from about 1 to about 8 propoxy units. Especially preferred are alkoxylated polyethyleneimines wherein the alkoxy chains comprise a combination of ethoxy and propoxy chains, in particular polyethyleneimines comprising chains of from 4 to 20 ethoxy units and from 0 to 6 propoxy units.

In preferred embodiments the alkoxylated polyalkyleneimine is obtained from alkoxylation followed by quaternization of a polyalkyleneimine, wherein the starting polyalkyleneimine has a weight-average molecular weight of from about 100 to about 60,000, preferably from about 200 to about 40,000, more preferably from about 300 to about 10,000 g/mol.

In preferred embodiments the bleach is selected from the group consisting of inorganic bleach, organic bleach and mixtures thereof. Compositions comprising inorganic bleach, in particular sodium percarbonate have been found to provide good bleaching performance.

Compositions comprising percarbonate have been found to provide really good bleaching. The composition of the invention gives rise to outstanding bleachable stain removal benefits even when it is phosphate free. Especially good performance is obtained when the composition comprises a complexing agent, specially methylglycine-N,N-diacetic acid or at salt thereof and/or a dispersant polymer, specially sulfonated polymer.

The compositions of the invention could be in any form, powder, liquid, etc. It has been found here that unit dose form provides a very convenient form for the composition of the invention, it prevents segregation that could occur if the composition is in powder or possibly liquid form. Segregation issues are especially problematic in compositions comprising ingredients in catalytic amounts such as the bleach enhancer.

According to another aspect of the invention, there is provided a method of cleaning cookware/tableware in an automatic dishwashing machine comprising the step of subjecting stained, preferably with tea and coffee stains, cookware/tableware to a washing liquor comprising the composition of the invention.

According to the last aspect of the invention, there is provided the use of the composition of the invention for the removal of bleachable stains and enzymatic soils from cookware/tableware in automatic dishwashing.

DETAILED DESCRIPTION OF THE INVENTION

The present invention envisages an automatic dishwashing detergent composition. The composition comprises an alkoxylated polyalkyleneimine, bleach, it is free of bleach catalyst and bleach activator and comprises an enzymatic system. The composition provides improved removal of bleachable stains, in particular tea and coffee stains and enzymatic soils, including crème brule, starch, protein and complex mixtures of starch and proteins. There is also provided a method of automatic dishwashing using the composition of the invention and the use of the composition for the removal of bleachable stains (specially tea and coffee) and enzymatic soils from cookware and tableware.

Alkoxylated Polyalkyleneimine

The alkoxylated polyalkyleneimine preferably comprises polyethyleneimine and more preferably it is a polyethyleneimine. Preferably the composition of the invention comprises from 0.1% to about 5%, preferably from about 0.2% to about 3% by weight of the composition of the polyalkyleneimine. Preferably the method of the invention delivers from about 20 to about 100 ppm of the polyalkyleneimine.

The alkoxylation of the polyalkyleneimine backbone comprises one or two alkoxylation modifications in a nitrogen atom, depending on whether the modification occurs at an internal nitrogen atom or at a terminal nitrogen atom in the polyalkyleneimine backbone, the alkoxylation modification involves the replacement of a hydrogen atom in a polyalkyleneimine by a monoalkoxylene or a polyalkoxylene chain preferably having an average of from about 1 to about 50 alkoxy units, wherein the terminal alkoxy unit of the polyalkoxylene chain is capped with hydrogen, C1-C4 alkyl or mixtures thereof. In addition, each nitrogen atom in the alkoxylated polyalkyleneimine may carry saturated or unsaturated, linear or branched alkyl, alkylaryl or aryl substituents, or combinations thereof, preferably benzyl substituents and/or C1-C12, preferably C1-C4 alkyl, aryl or alkylaryl substituents, resulting in neutral or cationic charge on each nitrogen atom depending on its total number of substituents. These modifications may result in permanent quaternization of polyalkyleneimine backbone nitrogen atoms. The degree of permanent quaternization is at least 5%, preferably at least 20%, more preferably from at least from 40% to 100% of the polyalkyleneimine backbone nitrogen atoms.

Preferably, all the nitrogen atoms would comprise alkoxylation modification(s) although it might be possible to have polyalkyleneimines wherein only part of the nitrogen atoms have been alkoxylated.

Examples of possible modifications are herein shown, the modifications correspond to terminal nitrogen atoms in the polyethyleneimine backbone where R represents an ethylene spacer and E represents a $C_1$-$C_{12}$ alkyl unit and $X^-$ represents a suitable water soluble counterion, such as chlorine, bromine or iodine, sulphate (i.e. —O—SO3H or —O—SO3-), alkylsulfonate such as methylsulfonate, arylsulfonate such as tolylsulfonate, and alkyl sulphate, such as methosulphate (i.e. —O—SO2-OMe)).

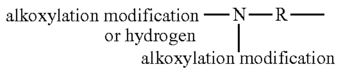

or

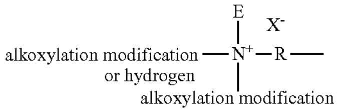

Examples of possible modifications are shown, the modifications correspond to internal nitrogen atoms in the polyethyleneimine backbone where R represents an ethylene spacer and E represents a C1-C12 alkyl unit and X— represents a suitable water soluble counterion.

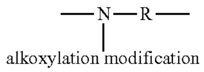

or

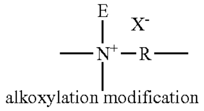

Also, for example, but not limited to, below is shown possible modifications to internal nitrogen atoms in the polyethyleneimine backbone where R represents an ethylene spacer and E represents a C1-C12 alkyl unit and X— represents a suitable water soluble counterion.

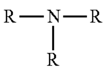

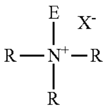

The alkoxylation modification of the polyalkyleneimine backbone may comprise the replacement of a hydrogen atom by a polyalkoxylene chain having an average of about 1 to about 50 alkoxy units, preferably from about 2 to about 40 alkoxy units, more preferably from about 3 to about 30 units and especially from about 3 to about 20 alkoxy units. The alkoxy units are preferably selected from ethoxy (EO), 1,2-propoxy (1,2-PO), butoxy (BO), and combinations thereof. Preferably, the polyalkoxylene chain is selected from ethoxy units and a combination of ethoxy and propoxy units. More preferably, the polyalkoxylene chain comprises ethoxy units in an average degree of from about 1 to about 50, more preferably from about 2 to about 40 and especially from about 3 to 20. Polyalkyleneimines comprising this degree of ethoxy units have been found to provide best performance in terms of removal of bleachable stains, in particular tea and coffee stains. Also preferred in terms of bleachable stain removal are polyalkoxylene chains comprising a mixture of ethoxy and propoxy chains, preferably the polyalkoxylene chain comprises ethoxy units in an average of from about 1 to about 30 and more preferably propoxy units in an average degree of from about 0 to about 10, more preferably from about 2 to about 20 ethoxy units and from about 1 to about 10 propoxy units.

An example of a preferred alkoxylated polyethyleneimine has the general structure of formula (I) or a quaternized version (II):

Formula (1)

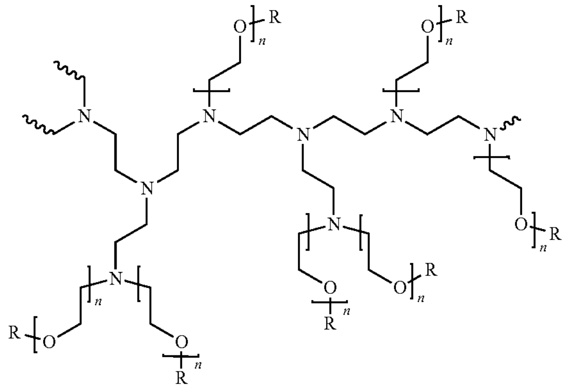

non-quarternized

-continued formula (II)

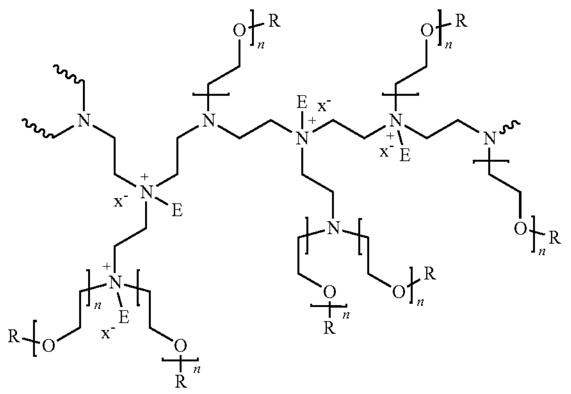

quarternized wherein the polyethyleneimine backbone has a weight average molecular weight of from about 600 to about 5000 g/mole, n of formula (I) or (II) has an average of 3 to 20 and R of formula (I) is selected from hydrogen, a C1-C4 alkyl or benzyl, and mixtures thereof. The degree of quaternization of the polyalkyleneimine backbone of formula (II) may be at least 5%, more preferably at least 20% and especially 70% or higher of the polyalkyleneimine backbone nitrogen atoms.

Another preferred polyethyleneimine has the general structure of formula (III), with the quaternized version shown as formula (IV):

formula (III)

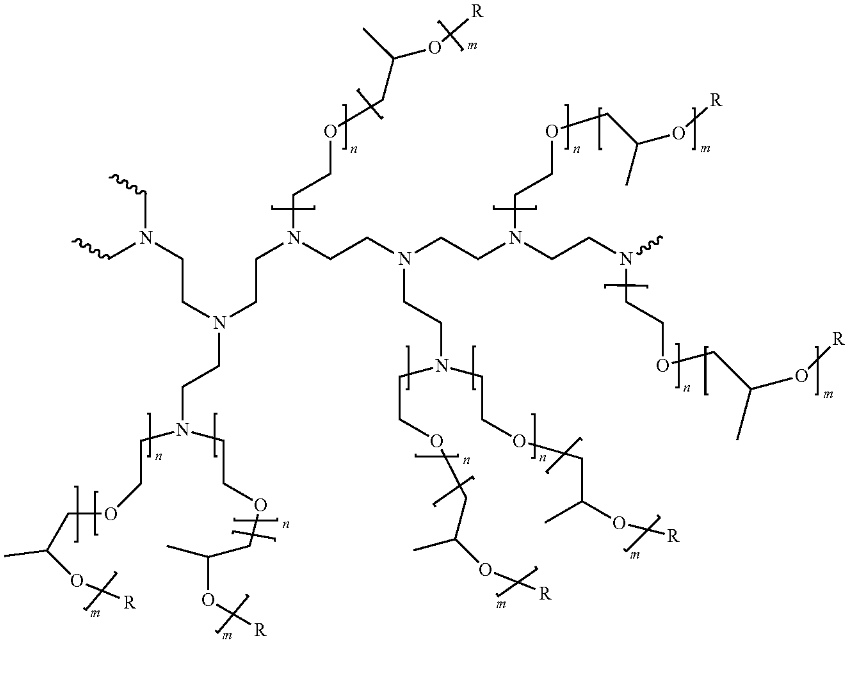

-continued formula (IV) - quaternized

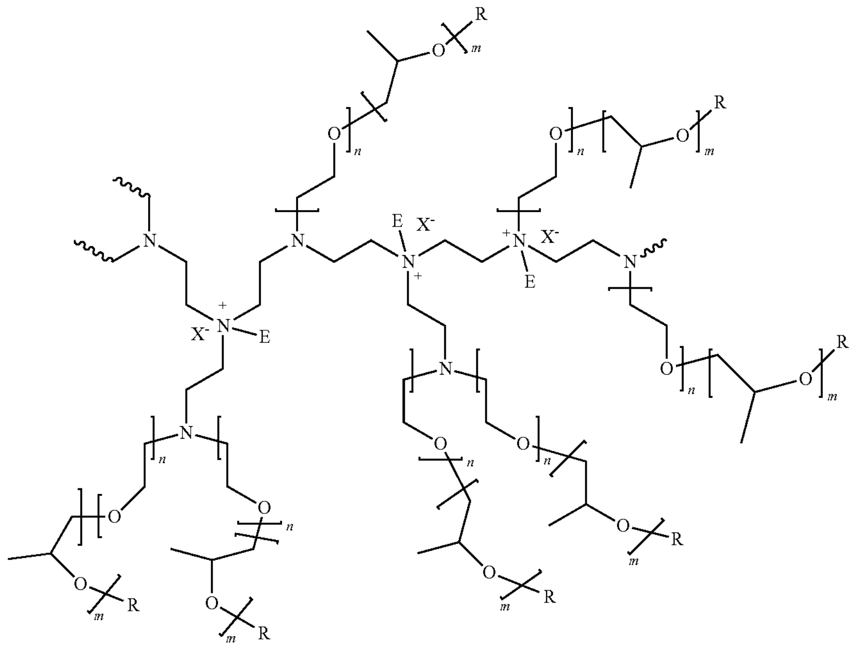

wherein the polyethyleneimine backbone has a weight average molecular weight of from about 600 to about 5000 g/mole, n of formulas (III) and (IV) has an average of 7, m of formulas (III) and (IV) have an average of 1 and R of formula (III) and (IV) is selected from hydrogen, a C1-C4 alkyl and mixtures thereof. The degree of permanent quaternization of formula (IV)) may be from 5% to 100%, preferably at least 10%, more preferably at least 20% of the polyethyleneimine backbone nitrogen atoms.

Polyalkyleneimines suitable for the composition of the invention can be prepared, for example, by polymerizing ethyleneimine in the presence of a catalyst such as carbon dioxide, sodium bisulfite, sulfuric acid, hydrogen peroxide, hydrochloric acid, acetic acid, and the like.

The alkoxylated polyalkylenimines may be prepared in a known manner by reaction of polyalkylene imines with alkoxy units, the process would herein be described for the ethoxylation of polyoxyethyleneimine.

One preferred procedure consists in initially undertaking only an incipient ethoxylation of the polyalkylene imine in a first step. In this step, the polyalkylene imine is reacted only with a portion of the total amount of ethylene oxide used, which corresponds to about 1 mol of ethylene oxide per mole of NH unit. This reaction is undertaken generally in the absence of a catalyst in an aqueous solution at a reaction temperature from about 70 to about 200° C. and preferably from about 80 to about 160° C. This reaction may be affected at a pressure of up to about 10 bar, and in particular up to about 8 bar.

In a second step, the further ethoxylation is then undertaken by subsequent reaction with the remaining amount of ethylene oxide. The further ethoxylation is undertaken typically in the presence of a basic catalyst. Examples of suitable catalysts are alkali metal and alkaline earth metal hydroxides such as sodium hydroxide, potassium hydroxide and calcium hydroxide, alkali metal alkoxides, in particular sodium and potassium C1-C4-alkoxides, such as sodium methoxide, sodium ethoxide and potassium tert-butoxide, alkali metal and alkaline earth metal hydrides such as sodium hydride and calcium hydride, and alkali metal carbonates such as sodium carbonate and potassium carbonate. Preference is given to the alkali metal hydroxides and the alkali metal alkoxides, particular preference being given to potassium hydroxide and sodium hydroxide. Typical use amounts for the base are from 0.05 to 10% by weight, in particular from 0.5 to 2% by weight, based on the total amount of polyalkyleneimine and alkylene oxide.

The further ethoxylation may be undertaken in substance (variant a)) or in an organic solvent (variant b)). In variant a), the aqueous solution of the incipiently ethoxylated polyalkylenimine obtained in the first step, after addition of the catalyst, is initially dewatered. This can be done in a simple manner by heating to from about 80 to about 150° C. and distilling off the water under a reduced pressure of from about 0.01 to about 0.5 bar. The subsequent reaction with the ethylene oxide is effected typically at a reaction temperature from about 70 to about 200° C. and preferably from about 100 to about 180° C. The subsequent reaction with the alkylene oxide is effected typically at a pressure of up to about 10 bar and in particular up to 8 bar. The reaction time of the subsequent reaction with the ethylene oxide is generally about 0.5 to about 4 hours. Suitable organic solvents for variant b) are in particular nonpolar and polar aprotic organic solvents. Examples of particularly suitable nonpolar aprotic solvents include aliphatic and aromatic hydrocarbons such as hexane, cyclohexane, toluene and xylene. Examples of particularly suitable polar aprotic solvents are ethers, in particular cyclic ethers such as tetrahydrofuran and dioxane, N,N-dialkylamides such as dimethylformamide and dimethylacetamide, and N-alkyllactams such as N-methylpyrrolidone. It is of course also possible to use mixtures of these organic solvents. Preferred organic solvents are xylene and toluene.

In variant b), the solution obtained in the first step, after addition of catalyst and solvent, is initially dewatered, which is advantageously done by separating out the water at a temperature of from about 120 to about 180° C., preferably supported by a gentle nitrogen stream. The subsequent reaction with the alkylene oxide may be effected as in variant a). In variant a), the alkoxylated polyalkylenimine is obtained directly in substance and may be converted if desired to an aqueous solution. In variant b), the organic solvent is typically removed and replaced by water. The products may, of course, also be isolated in substance.

The quaternization of alkoxylated polyethyleneimines is achieved preferably by introducing C1-C12 alkyl, aryl or alkylaryl groups and may be undertaken in a customary manner by reaction with corresponding alkyl-, alkylaryl-halides and dialkylsulfates, as described for example in WO2009060059.

The quaternization of ethoxylated polyethyleneimines is achieved preferably by reacting the amines with at least one alkylating compound, which is selected from the compounds of the formula EX, wherein E is C1-C12 alkyl, aryl or alkyl and X is a leaving group, which is capable of being replaced by nitrogen (and C2-C6 alkylene oxide, especially ethylene oxide or propylene oxide).

Suitable leaving groups X are halogen, especially chlorine, bromine or iodine, sulphate (i.e. —O SO3H or —O SO3-), alkylsulfonate such as methylsulfonate, arylsulfonate such as tolylsulfonate, and alkyl sulphate, such as methosulphate (i.e. —O SO2 OMe). Preferred alkylating agents EX are C1-C12 alkyl halides, bis (C1-C12-alkyl)sulfates, and benzyl halides. Examples of such alkylating agents are ethyl chloride, ethyl bromide, methyl chloride, methyl bromide, benzyl chloride, dimethyl sulphate, diethyl sulphate.

The amount of alkylating agent determines the amount of quaternization of the amino groups in the polymer. The amount of the quaternization can be calculated from the difference of the amine number in the non-quaternized amine and the quaternized amine.

The amine number can be determined according to the method described in DIN 16945. The reaction can be carried out without any solvent, however, a solvent or diluent like water, acetonitrile, dimethylsulfoxide, N-Methylpyrrolidone, etc. may be used. The reaction temperature is usually in the range from 10° C. to 150° C. and is preferably from 50° C. to 110° C.

All molecular weights related to the alkoxylated polyalkyleneimine of the composition of the invention are weight-average molecular weights expressed as grams/mole, unless otherwise specified. The molecular weight can be measured using gel permeation chromatography.

Molecular Weight Determination:

Molecular weight is determined as weight-average molecular weight ($M_w$) by gel permeation chromatography (GPC) using a serial configuration of the GPC columns HEMA Bio linear, 40·8 mm 10 μm, HEMA Bio 100, 300·8 mm, 10 μm, HEMA Bio 1000, 300·8 mm, 10 μm and HEMA Bio 10000, 300·8 mm, 10 μm, (obtained from PSS Polymer Standards Service GmbH, Mainz, Germany). The eluent is 1.5% aqueous formic acid, flow is 1 ml/min, injected volume is 20 μl, sample concentration is 1%. The method is calibrated with a Pullulan standard (MW 342-1660000 g/mol, obtained from PSS Polymer Standards Service GmbH, Mainz, Germany).

Preferably the polyalkyleneimine is preferably free of other alkyleneoxide units other than ethoxy and propoxy.

SYNTHESIS EXAMPLES

Example 1: Synthesis of PEI5000+7EO/NH, 50% Quaternized with Dimethyl Sulfate a) PEI5000+1EO/NH In a 3.5 l autoclave 2568.0 g of a polyethyleneimine 5000 (average molecular weight $M_w$ of 5000, 50% solution in water) were heated to 80° C. and purged three times with nitrogen up to a pressure of 5 bar. After the temperature had been increased to 110° C., 1314.2 g ethylene oxide were added in portions up to 7 bar. To complete the reaction, the mixture was allowed to post-react for 2 h at 110° C. The reaction mixture was stripped with nitrogen and volatile compounds were removed in vacuum at 70° C. The temperature was increased to 90-110° C. and the mixture was dewatered for 2 hours in vacuum.

2580.0 g of polyethyleneimine 5000 with 1 mole of ethylene oxide per mole NH were obtained as a dark brown viscous oil (Amine value: 512 mg KOH/g).

b) PEI5000+7EO/NH

In a 5 l autoclave 997.6 g of the product obtained in Example 1 a) and 29.9 g of a 50% by weight aqueous solution of potassium hydroxide were heated to 80° C. and purged three times with nitrogen. The mixture was dewatered at 120° C. and a vacuum of 10 mbar for 2 h. After the vacuum had been removed with nitrogen, the temperature was increased to 140° C. and 3027.2 g ethylene oxide were added in portions up to 7 bar. To complete the reaction, the mixture was allowed to post-react for 2 h at 120° C. The reaction mixture was stripped with nitrogen and volatile compounds were removed in vacuum at 70° C.

4040.0 g of a polyethyleneimine 5000 with 7 mole of ethylene oxide per mole NH bond were obtained as a brown viscous liquid (Amine value: 137.4 mg KOH/g; pH of a 10% by weight aqueous solution: 11.7; viscosity (70° C.): 325 mPas).

c) PEI5000+7EO/NH, 50% Quaternized with Dimethyl Sulfate

In a 2 l reaction vessel 1500.0 g of the product from example 1 b) was heated to 70-75° C. under a constant stream of nitrogen. 232.0 g dimethyl sulfate was added within 2 h. The reaction mixture was stirred for additional 2 h at 75° C.

1720.0 g of light brown solid were obtained (Amine value: 63.3 mg KOH/g; pH of a 10% by weight aqueous solution: 7.8; Viscosity (70° C.): 838 mPas).

Example 2: Synthesis of PEI600+10EO/NH, 75% Quaternized with Dimethyl Sulfate a) PEI600+1EO/NH In a 3.5 l autoclave 1328.5 g of a polyethyleneimine 600 (average molecular weight $M_w$ of 600) and 66.4 g water were heated to 80° C. and purged three times with nitrogen up to a pressure of 5 bar. After the temperature had been increased to 120° C., 1359.4 g ethylene oxide were added in portions up to 7 bar. To complete the reaction, the mixture was allowed to post-react for 2 h at 120° C. The reaction mixture was stripped with nitrogen and volatile compounds were removed in vacuo at 70° C. The temperature was increased to 90-110° C. and the mixture was dewatered for 2 hours in vacuo.

2688.0 g of polyethyleneimine 600 with 1 mole of ethylene oxide per mole NH were obtained as a yellow viscous oil (Amine value: 549 mg KOH/g; pH of a 1% by weight aqueous solution: 11.06).

b) PEI600+10 EO/NH

In a 5 l autoclave 704.5 g of the product obtained in Example 1 a) and 21.1 g of a 50% by weight aqueous solution of potassium hydroxide were heated to 80° C. and purged three times with nitrogen. The mixture was dewatered at 120° C. and a vacuum of 10 mbar for 2 h. After the vacuum had been removed with nitrogen, the temperature was increased to 145° C. and 3206.7 g ethylene oxide were added in portions up to 7 bar. To complete the reaction, the mixture was allowed to post-react for 2 h at 120° C. The reaction mixture was stripped with nitrogen and volatile compounds were removed in vacuo at 70° C. 3968.0 g of a polyethyleneimine 600 with 10 mole of ethylene oxide per mole NH bond were obtained as a yellow-brown viscous liquid (Amine value: 101.5 mg KOH/g; pH of a 10% by weight aqueous solution: 11.6).

c) PEI600+10 EO/NH, 75% Quatemized with Dimethyl Sulfate

In a 0.5 l reaction vessel 120.0 g of the product from example 1 b) was heated to 70-75° C. under a constant stream of nitrogen. 20.5 g dimethyl sulfate was added within 15 min. The reaction mixture was stirred for additional 2 h at 75° C. For adjusting pH, 1.0 g NaOH (50% in water) was added. 110.0 g of light brown solid were obtained (Amine value: 23.5 mg KOH/g; pH of a 10% by weight aqueous solution: 9.3).

Example 3: Synthesis of PEI600+7EO/NH, 75% Quaternized with Dimethyl Sulfate a) PEI600+7 EO/NH In a 2 l autoclave 261.0 g of the product obtained in Example 1 a) and 7.8 g of a 50% by weight aqueous solution of potassium hydroxide were heated to 80° C. and purged three times with nitrogen. The mixture was dewatered at 120° C. and a vacuum of 10 mbar for 2 h. After the vacuum had been removed with nitrogen, the temperature was increased to 145° C. and 792.0 g ethylene oxide were added in portions up to 7 bar. To complete the reaction, the mixture was allowed to post-react for 2 h at 120° C. The reaction mixture was stripped with nitrogen and volatile compounds were removed in vacuo at 70° C.

1056.0 g of a polyethyleneimine 600 with 7 mole of ethylene oxide per mole NH bond were obtained as a yellow-brown viscous liquid (Amine value: 147.8 mg KOH/g; pH of a 10% by weight aqueous solution: 11.6).

b) PEI600+7 EO/NH, 75% Quatemized with Dimethyl Sulfate

In a 0.5 l reaction vessel 250.0 g of the product from example 2 a) was heated to 70-75° C. under a constant stream of nitrogen. 58.4 g dimethyl sulfate was added within 15 min. The reaction mixture was stirred for additional 2 h at 75° C.

299.0 g of light brown solid were obtained (Amine value: 35.84 mg KOH/g; pH of a 10% by weight aqueous solution: 6.0; Iodine color number (10% in water): 4.0).

Detergent Composition

The detergent composition of the invention can be presented in any form. Preferably, the composition or part thereof is the form of loose powder and more preferable the composition is provided in unit-dose form, more preferably a unit dose form having a weight of from 10 to 20 grams. The composition of the invention is very well suited to be presented in the form of a multi-compartment pack, more in particular a multi-compartment pack comprising compartments with compositions in different physical forms, for example a compartment comprising a composition in the form of loose powder and another compartment comprising a composition in liquid form. The composition is preferably enveloped by a water-soluble film such as polyvinyl alcohol. The composition optionally but preferably comprises a complexing agent and/or a dispersant polymer. Preferably, the composition comprises the tri-sodium salt of MGDA, HEDP, dispersant polymer preferably a sulfonated polymer comprising 2-acrylamido-2-methylpropane sulfonic acid monomers, sodium carbonate, a bleach, preferably sodium percarbonate, protease and amylase enzymes and non-ionic surfactant and optionally crystalline silicaate. The composition is preferably free of citrate. The composition can further comprise a cationic polymer that provides anti-spotting benefits.

The composition of the invention preferably has a pH as measured in 1% weight/volume aqueous solution in distilled water at 20° C. of from about 9 to about 12, more preferably from about 10 to less than about 11.5 and especially from about 10.5 to about 11.5.

The composition of the invention preferably has a reserve alkalinity of from about 10 to about 20, more preferably from about 12 to about 18 at a pH of 9.5 as measured in NaOH with 100 mL of product at 20° C.

Complexing Agent

Complexing agents are materials capable of sequestering hardness ions, particularly calcium and/or magnesium. The composition of the invention comprises a high level of complexing agent, however the level should not be too high otherwise enzymes, in particular proteases can be negatively affected. Too high level of complexing agent can also negatively impact on glass care.

The composition of the invention preferably comprises from 15% to 40%, preferably from 20% to 40%, more preferably from 20% to 35% by weight of the composition of a complexing agent selected from the group consisting of methylglycine-N,N-diacetic acid (MGDA), citric acid, glutamic acid-N,N-diacetic acid (GLDA) its salts and mixtures thereof. Especially preferred complexing agent for use herein is a salt of MGDA, in particular the trisodium salt of MGDA. Preferably, the composition of the invention comprises from 10% to 40% by weight of the composition of the trisodium salt of MGDA.

Sodium Silicate

The composition of the present invention may comprise silicate. If the composition comprises silicate, it preferably comprises from 2% to 8%, more preferably from 3% to 6% by weight of the composition of a crystalline sodium silicate. The crystalline sodium silicate, is preferably a layered silicate and preferably has the composition NaMSix O2x+1. y H2O, in which M denotes sodium or hydrogen, x is 1.9 to 4 and y is 0 to 20.

The crystalline sodium silicates that can be optionally used in the composition of the invention can be layered in scanning electron microscope photographs.

From the known compounds of the formula Na2SixO2x+1. y H2O, the corresponding compounds NaHSix O2x+1. y $H_2O$ can be prepared by treatment with acids and, in some cases, also with water. The water content given by the number y makes no differentiation between water of crystallization and adhering water. M preferably represents sodium. Preferred values of x are from 1.9 to 4. Compounds having the composition NaMSi 2 O5. y H2O are particularly preferred. Since the sodium silicates employed according to the invention are crystalline compounds, they can easily be characterized by their X-ray diffraction diagrams.

Preferred layered crystalline silicates are those, in which x in the aforesaid general formula assumes the values 1.9 to 3.5.

In particular, both delta- and beta-disodium disilicate ($Na_2Si_2O_5.yH_2O$) are preferred, with beta-disodium disilicate can be obtained, for example, by the process described in WO 91/08171 A1. Beta-disodium silicates with a molar ratio of SiO 2/Na 2 O between 1, 9 and 3.2 can be prepared according to Japanese Patent Application JP04/238809A or JP04/260610A. It can also be prepared from amorphous silicates, practically anhydrous crystalline alkali metal silicates of the abovementioned general formula (1), in which x is a number from 1, 9 to 2.1.

In a further preferred embodiment of such agents, a crystalline sodium layer silicate with a molar ratio of SiO2/Na2O of 1.8 to 3 is used. In a preferred form, crystalline layered disodium disilicate builder is form from varying percentages of polymorphic phases alpha, beta and delta together. In commercially produced products, amorphous portions may also be present.

The definitions of alpha, beta and delta disodium disilicate are known and can be found, for example, in EP0164514A1, as set forth below. The disodium state is preferably a layered crystalline disodium disilicate which consists of at least one of the polymorphic phases of the disodium disilicate and of sodium silicates of non-layered silicate nature. Particular preference is given to using crystalline sodium layer silicates having a content of from 80 to 100% by weight of delta-disodium disilicate. In a further preferred variant, it is also possible to use crystalline sodium layer silicates having a content of 70 to 100% by weight of beta disodium disilicate.

Crystalline sodium layer silicates used with particular preference contain 1 to 40% by weight of alpha disodium disilicate, 0 to 50% by weight, in particular 0 to 45% by weight, of beta disodium disilicate, 50 to 98% by weight of delta disodium disilicate and 0 to 40% by weight of non-silicate sodium silicates (amorphous portions).

Very particularly preferably used crystalline layered sodium silicates contain 7 to 21 wt % alpha disodium disilicate, 0 to 12 wt % beta disodium disilicate, 65 to 95 wt % delta disodium disilicate and 0 to 20 wt % amorphous shares.

The abovementioned alpha-disodium disilicate corresponds to the Na-SK-S5 described in EP0164514 A1, characterized by those reproduced by X-ray diffraction data assigned to alpha-Na2Si2O5. The X-ray diffraction diagrams are available from the Joint Committee of Powder Diffraction Standards are registered under numbers 18-1241, 22-1397, 22-1397A, 19-1233, 19-1234 and 19-1237.

The abovementioned beta-disodium disilicate corresponds to the Na-SKS-7 described in EP064514 A1, characterized by those reproduced there X-ray diffraction data assigned to beta-Na2Si2O5. The X-ray diffraction diagrams are available from the Joint Committee of Powder Diffraction Standards registered under the numbers 24-1123 and 29-1261.

The abovementioned delta-disodium disilicate corresponds to that in EP0164514A described Na-SKS-6, characterized by the reproduced there X-ray diffraction data assigned to the delta-Na2Si2O5. The X-ray diffraction patterns are registered with the Joint Committee of Powder Diffraction Standards under the number 22-1396.

The compositions according to the invention contain crystalline sodium layer silicate of the formula (1) in granulated form, and also cogranules containing crystalline sodium layer silicate and sparingly soluble metal carbonate, as described, for example, in WO2007/101622 A1.

In a further preferred embodiment of the invention, the compositions of invention according to contain crystalline sodium disilicates Na2Si2O5.yH20 with y=0 to 2.

In a preferred form, the crystalline layered sodium silicates additionally contain cationic and/or anionic constituents. The cationic constituents are preferably combinations of alkali metal and/or alkaline earth metal cations and/or Fe, W, Mo, Ta, Pb, A1, Zn, Ti, V, Cr, Mn, Co and/or Ni.

The anionic constituents are preferably aluminates, sulfates, fluorides, chlorides, bromides, iodides, carbonates, bicarbonates, nitrates, oxide hydrates, phosphates and/or borates.

In an alternative preferred form containing crystalline layered sodium silicates, based on the total content of SiO2, up to 10 mol % boron. In another alternative preferred form include the crystalline layered sodium silicates, based on the total content of SiO2, up to 20 mol % Phosphorus.

Also, particularly preferred are sodium disilicates prepared hydrothermally of formula beta-Na are 2 Si2O5, as described in patent documents WO92/09526 A1, U.S. Pat. No. 5,417,951, DE 41 02 743 A1 and WO92/13935 A1, As sodium layer silicates, those according to WO00/09444 A1 are particularly preferred. Further preferred sodium layer silicates are those according to EP 0 550 048 A1 and EP 0 630 855 A1.

The especially preferred silicate for use herein has the formula: Na2Si2O5.

Carbonate

The composition of the invention preferably comprise carbonate. It preferably comprises from 10% to 30%, preferably 5% to 25% by weight of the composition of sodium carbonate.

Phosphonate

Preferably the composition of the invention comprises phosphonate, preferably HEDP. It preferably comprise from 0.5% to 7%, preferably 1% to 6% by weight of the composition of HEDP.

The composition is preferably free of phosphate, i.e., comprises less than 1%, more preferably less than 0.1% by weight of the composition of phosphate.

Bleach

Inorganic and organic bleaches are suitable for use herein. Inorganic bleaches include perhydrate salts such as perborate, percarbonate, perphosphate, persulfate and persilicate salts. The inorganic perhydrate salts are normally the alkali metal salts. The inorganic perhydrate salt may be included as the crystalline solid without additional protection. Alternatively, the salt can be coated.

Alkali metal percarbonates, particularly sodium percarbonate is the preferred bleach for use herein. The percarbonate is most preferably incorporated into the products in a coated form which provides in-product stability.

Potassium peroxymonopersulfate is another inorganic perhydrate salt of utility herein.

Typical organic bleaches are organic peroxyacids, especially diperoxydodecanedioc acid, diperoxytetradecanedioc acid, and diperoxyhexadecanedioc acid. Mono- and diperazelaic acid, mono- and diperbrassylic acid are also suitable herein. Diacyl and Tetraacylperoxides, for instance dibenzoyl peroxide and dilauroyl peroxide, are other organic peroxides that can be used in the context of this invention.

Further typical organic bleaches include the peroxyacids, particular examples being the alkylperoxy acids and the arylperoxy acids. Preferred representatives are (a) peroxybenzoic acid and its ring-substituted derivatives, such as alkylperoxybenzoic acids, but also peroxy-α-naphthoic acid and magnesium monoperphthalate, (b) the aliphatic or substituted aliphatic peroxy acids, such as peroxylauric acid, peroxystearic acid, ε-phthalimidoperoxycaproic acid[phthaloiminoperoxyhexanoic acid (PAP)], o-carboxybenzamidoperoxycaproic acid, N-nonenylamidoperadipic acid and N-nonenylamidopersuccinates, and (c) aliphatic and araliphatic peroxydicarboxylic acids, such as 1,12-diperoxycarboxylic acid, 1,9-diperoxyazelaic acid, diperoxysebacic acid, diperoxybrassylic acid, the diperoxyphthalic acids, 2-decyldiperoxybutane-1,4-dioic acid, N,N-terephthaloyldi (6-aminopercaproic acid).

Preferably, the level of bleach in the composition of the invention is from about 1 to about 20%, more preferably from about 2 to about 25%, even more preferably from about 3 to about 20% by weight of the composition. Specially preferred are compositions comprising percarbonate.

Dispersant Polymer

The dispersant polymer is used in any suitable amount from about 1 to about 7%, preferably from 2 to about 6% by weight of the composition.

The dispersant polymer is capable to suspend calcium or calcium carbonate in an automatic dishwashing process. Preferably, the dispersant polymers are sulfonated derivatives of polycarboxylic acids and may comprise two, three, four or more different monomer units. The preferred copolymers contain:

At least one structural unit derived from a carboxylic acid monomer having the general formula (III):

(III)

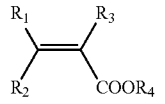

alkyl groups having from 2 to 12 carbon atoms, linear or branched mono or polyunsaturated alkenyl groups having from 2 to 12 carbon atoms, alkyl or alkenyl groups as aforementioned substituted with —NH2 or —OH, or —COOH, or COOR4, where R4 is selected from hydrogen, alkali metal, or a linear or branched, saturated or unsaturated alkyl or alkenyl group with 2 to 12 carbons; Preferred carboxylic acid monomers include one or more of the following: acrylic acid, maleic acid, maleic anhydride, itaconic acid, citraconic acid, 2-phenylacrylic acid, cinnamic acid, crotonic acid, fumaric acid, methacrylic acid, 2-ethylacrylic acid, methylenemalonic acid, or sorbic acid. Acrylic and methacrylic acids being more preferred.

Optionally, one or more structural units derived from at least one nonionic monomer having the general formula (IV):

(IV)

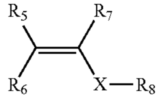

Wherein R5 to R7 are independently selected from hydrogen, methyl, phenyl or hydroxyalkyl groups containing 1 to 6 carbon atoms, and can be part of a cyclic structure, X is an optionally present spacer group which is selected from —CH2-, —COO—, —CONH— or —CONR8-, and R8 is selected from linear or branched, saturated alkyl radicals having 1 to 22 carbon atoms or unsaturated, preferably aromatic, radicals having from 6 to 22 carbon atoms.

Preferred non-ionic monomers include one or more of the following: butene, isobutene, pentene, 2-methylpent-1-ene, 3-methylpent-1-ene, 2,4,4-trimethylpent-1-ene, 2,4,4-trimethylpent-2-ene, cyclopentene, methylcyclopentene, 2-methyl-3-methyl-cyclopentene, hexene, 2,3-dimethylhex-1-ene, 2,4-dimethylhex-1-ene, 2,5-dimethylhex-1-ene, 3,5-dimethylhex-1-ene, 4,4-dimethylhex-1-ene, cyclohexene, methylcyclohexene, cycloheptene, alpha olefins having 10 or more carbon atoms such as, dec-1-ene, dodec-1-ene, hexadec-1-ene, octadec-1-ene and docos-1-ene, preferred aromatic monomers are styrene, alpha methylstyrene, 3-methylstyrene, 4-dodecylstyrene, 2-ethyl-4-bezylstyrene, 4-cyclohexylstyrene, 4-propylstyrol, 1-vinylnaphtalene, 2-vinylnaphtalene; preferred carboxylic ester monomers are methyl (meth)acrylate, ethyl (meth)acrylate, propyl (meth) acrylate, t-butyl (meth)acrylate, pentyl (meth)acrylate, hexyl (meth)acrylate, 2-ethylhexyl (meth)acrylate, octyl (meth) acrylate, lauryl (meth)acrylate, stearyl (meth)acrylate and behenyl (meth)acrylate; preferred amides are N-methyl acrylamide, N-ethyl acrylamide, N-t-butyl acrylamide, N-2-ethylhexyl acrylamide, N-octyl acrylamide, N-lauryl acrylamide, N-stearyl acrylamide, N-behenyl acrylamide; and at least one structural unit derived from at least one sulfonic acid monomer having the general formula (V) and (VI):

(V)

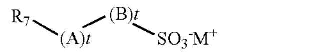

(VI)

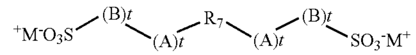

wherein R7 is a group comprising at least one sp2 bond, A is O, N, P, S, an amido or ester linkage, B is a mono- or polycyclic aromatic group or an aliphatic group, each t is independently 0 or 1, and M+ is a cation. In one aspect, R7 is a C2 to C6 alkene. In another aspect, R7 is ethene, butene or propene.

Preferred sulfonated monomers include one or more of the following: 1-acrylamido-1-propanesulfonic acid, 2-acrylamido-2-propanesulfonic acid, 2-acrylamido-2-methyl-1-propanesulfonic acid, 2-methacrylamido-2-methyl-1-propanesulfonic acid, 3-methacrylamido-2-hydroxy-propanesulfonic acid, allylsulfonic acid, methallylsulfonic acid, allyloxybenzenesulfonic acid, methallyloxybenzene-sulfonic acid, 2-hydroxy-3-(2-propenyloxy) propanesulfonic acid, 2-methyl-2-propen-1-sulfonic acid, styrenesulfonic acid, vinylsulfonic acid, 3-sulfopropyl, 3-sulfo-propylmeth-acrylate, sulfomethacrylamide, sulfomethylmethacrylamide and mixtures of said acids or their water-soluble salts.

Preferably, the polymer comprises the following levels of monomers: from about 40 to about 90%, preferably from about 60 to about 90% by weight of the polymer of one or more carboxylic acid monomer; from about 5 to about 50%, preferably from about 10 to about 40% by weight of the polymer of one or more sulfonic acid monomer; and optionally from about 1% to about 30%, preferably from about 2 to about 20% by weight of the polymer of one or more non-ionic monomer. An especially preferred polymer comprises about 70% to about 80% by weight of the polymer of at least one carboxylic acid monomer and from about 20% to about 30% by weight of the polymer of at least one sulfonic acid monomer.

In the polymers, all or some of the carboxylic or sulfonic acid groups can be present in neutralized form, i.e. the acidic hydrogen atom of the carboxylic and/or sulfonic acid group in some or all acid groups can be replaced with metal ions, preferably alkali metal ions and in particular with sodium ions.

The carboxylic acid is preferably (meth)acrylic acid. The sulfonic acid monomer is preferably 2-acrylamido-2-propanesulfonic acid (AMPS).

Preferred commercial available polymers include: Alcosperse 240, Aquatreat AR 540 and Aquatreat MPS supplied by Alco Chemical; Acumer 3100, Acumer 2000, Acusol 587G and Acusol 588G supplied by Dow; Goodrich K-798, K-775 and K-797 supplied by BF Goodrich; and ACP 1042 supplied by ISP technologies Inc. Particularly preferred polymers are Acusol 587G and Acusol 588G supplied by Rohm & Haas.

Suitable dispersant polymers include anionic carboxylic polymer of low molecular weight. They can be homopolymers or copolymers with a weight average molecular weight of less than or equal to about 200,000 g/mol, or less than or equal to about 75,000 g/mol, or less than or equal to about 50,000 g/mol, or from about 3,000 to about 50,000 g/mol, preferably from about 5,000 to about 45,000 g/mol. The dispersant polymer may be a low molecular weight homopolymer of polyacrylate, with an average molecular weight of from 1,000 to 20,000, particularly from 2,000 to 10,000, and particularly preferably from 3,000 to 5,000.

The dispersant polymer may be a copolymer of acrylic with methacrylic acid, acrylic and/or methacrylic with maleic acid, and acrylic and/or methacrylic with fumaric acid, with a molecular weight of less than 70,000. Their molecular weight ranges from 2,000 to 80,000 and more preferably from 20,000 to 50,000 and in particular 30,000 to 40,000 g/mol, and a ratio of (meth)acrylate to maleate or fumarate segments of from 30:1 to 1:2.

The dispersant polymer may be a copolymer of acrylamide and acrylate having a molecular weight of from 3,000 to 100,000, alternatively from 4,000 to 20,000, and an acrylamide content of less than 50%, alternatively less than 20%, by weight of the dispersant polymer can also be used. Alternatively, such dispersant polymer may have a molecular weight of from 4,000 to 20,000 and an acrylamide content of from 0% to 15%, by weight of the polymer.

Dispersant polymers suitable herein also include itaconic acid homopolymers and copolymers.

Alternatively, the dispersant polymer can be selected from the group consisting of alkoxylated polyalkyleneimines, alkoxylated polycarboxylates, polyethylene glycols, styrene co-polymers, cellulose sulfate esters, carboxylated polysaccharides, amphiphilic graft copolymers and mixtures thereof.

Surfactant

Surfactants suitable for use herein include non-ionic surfactants, preferably the compositions are free of any other surfactants. Traditionally, non-ionic surfactants have been used in automatic dishwashing for surface modification purposes in particular for sheeting to avoid filming and spotting and to improve shine. It has been found that non-ionic surfactants can also contribute to prevent redeposition of soils.

Preferably the composition of the invention comprises a non-ionic surfactant or a non-ionic surfactant system, more preferably the non-ionic surfactant or a non-ionic surfactant system has a phase inversion temperature, as measured at a concentration of 1% in distilled water, between 40 and 70° C., preferably between 45 and 65° C. By a "non-ionic surfactant system" is meant herein a mixture of two or more non-ionic surfactants. Preferred for use herein are non-ionic surfactant systems. They seem to have improved cleaning and finishing properties and better stability in product than single non-ionic surfactants.

Phase inversion temperature is the temperature below which a surfactant, or a mixture thereof, partitions preferentially into the water phase as oil-swollen micelles and above which it partitions preferentially into the oil phase as water swollen inverted micelles. Phase inversion temperature can be determined visually by identifying at which temperature cloudiness occurs.

The phase inversion temperature of a non-ionic surfactant or system can be determined as follows: a solution containing 1% of the corresponding surfactant or mixture by weight of the solution in distilled water is prepared. The solution is stirred gently before phase inversion temperature analysis to ensure that the process occurs in chemical equilibrium. The phase inversion temperature is taken in a thermostable bath by immersing the solutions in 75 mm sealed glass test tube. To ensure the absence of leakage, the test tube is weighed before and after phase inversion temperature measurement. The temperature is gradually increased at a rate of less than 1° C. per minute, until the temperature reaches a few degrees below the pre-estimated phase inversion temperature. Phase inversion temperature is determined visually at the first sign of turbidity.

Suitable nonionic surfactants include: i) ethoxylated nonionic surfactants prepared by the reaction of a monohydroxy alkanol or alkyphenol with 6 to 20 carbon atoms with preferably at least 12 moles particularly preferred at least 16 moles, and still more preferred at least 20 moles of ethylene oxide per mole of alcohol or alkylphenol; ii) alcohol alkoxylated surfactants having a from 6 to 20 carbon atoms and at least one ethoxy and propoxy group. Preferred for use herein are mixtures of surfactants i) and ii).

Another suitable non-ionic surfactants are epoxy-capped poly(oxyalkylated) alcohols represented by the formula:

$$R1O[CH2CH(CH3)O]x[CH2CH2O]y[CH2CH(OH)R2] \quad (I)$$

wherein R1 is a linear or branched, aliphatic hydrocarbon radical having from 4 to 18 carbon atoms; R2 is a linear or branched aliphatic hydrocarbon radical having from 2 to 26 carbon atoms; x is an integer having an average value of from 0.5 to 1.5, more preferably about 1; and y is an integer having a value of at least 15, more preferably at least 20.

Preferably, the surfactant of formula I, at least about 10 carbon atoms in the terminal epoxide unit [CH2CH(OH)R2]. Suitable surfactants of formula I, according to the present invention, are Olin Corporation's POLY-TERGENT® SLF-18B nonionic surfactants, as described, for example, in WO 94/22800, published Oct. 13, 1994 by Olin Corporation.

Amine oxides surfactants useful herein include linear and branched compounds having the formula:

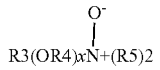

wherein R3 is selected from an alkyl, hydroxyalkyl, acylamidopropoyl and alkyl phenyl group, or mixtures thereof, containing from 8 to 26 carbon atoms, preferably 8 to 18 carbon atoms; R4 is an alkylene or hydroxyalkylene group containing from 2 to 3 carbon atoms, preferably 2 carbon atoms, or mixtures thereof; x is from 0 to 5, preferably from 0 to 3; and each R5 is an alkyl or hydroxyalkyl group containing from 1 to 3, preferably from 1 to 2 carbon atoms, or a polyethylene oxide group containing from 1 to 3, preferable 1, ethylene oxide groups. The R5 groups can be attached to each other, e.g., through an oxygen or nitrogen atom, to form a ring structure.

These amine oxide surfactants in particular include C10-C18 alkyl dimethyl amine oxides and C8-C18 alkoxy ethyl dihydroxyethyl amine oxides. Examples of such materials include dimethyloctylamine oxide, diethyldecylamine oxide, bis-(2-hydroxyethyl)dodecylamine oxide, dimethyldodecylamine oxide, dipropyltetradecylamine oxide, methylethylhexadecylamine oxide, dodecylamidopropyl dimethylamine oxide, cetyl dimethylamine oxide, stearyl dimethylamine oxide, tallow dimethylamine oxide and dimethyl-2-hydroxyoctadecylamine oxide. Preferred are C10-C18 alkyl dimethylamine oxide, and C10-18 acylamido alkyl dimethylamine oxide.

Surfactants may be present in amounts from 0 to 15% by weight, preferably from 0.1% to 10%, and most preferably from 0.25% to 8% by weight of the total composition.

Enzymes

In describing enzyme variants herein, the following nomenclature is used for ease of reference: Original amino acid(s):position(s):substituted amino acid(s). Standard enzyme IUPAC 1-letter codes for amino acids are used.

Proteases

The composition of the invention is beneficial in terms of removal of proteinaceous soils, in particular sugary burn soils such as crème brulee.

The composition of the invention can comprise a protease. A mixture of two or more proteases can also contribute to an enhanced cleaning across a broader temperature, cycle duration, and/or substrate range, and provide superior shine benefits, especially when used in conjunction with an anti-redeposition agent and/or a sulfonated polymer.

Suitable proteases include metalloproteases and serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include: (a) subtilisins (EC 3.4.21.62), especially those derived from *Bacillus*, such as *Bacillus* sp., *B. lentus, B. alkalophilus, B. subtilis, B. amyloliquefaciens, B. pumilus, B. gibsonii*, and *B. akibaii* described in WO2004067737, WO2015091989, WO2015091990, WO2015024739, WO2015143360, U.S. Pat. Nos. 6,312,936, 5,679,630, 4,760,025, DE102006022216A1, DE 102006022224A1, WO2015089447, WO2015089441, WO2016066756, WO2016066757, WO2016069557, WO2016069563, WO2016069569.

(b) trypsin-type or chymotrypsin-type proteases, such as trypsin (e.g., of porcine or bovine origin), including the *Fusarium* protease described in WO 89/06270 and the chymotrypsin proteases derived from Cellumonas described in WO 05/052161 and WO 05/052146.

(c) metalloproteases, especially those derived from *Bacillus amyloliquefaciens* described in WO07/044993A2; from *Bacillus, Brevibacillus, Thermoactinomyces, Geobacillus, Paenibacillus*, Lysinibacillus or *Streptomyces* spp. described in WO2014194032, WO2014194054 and WO2014194117; from *Kribella alluminosa* described in WO2015193488; and from *Streptomyces* and Lysobacter described in WO2016075078.

(d) protease having at least 90% identity to the subtilase from *Bacillus* sp. TY 145, NCIMB 40339, described in WO92/17577 (Novozymes A/S), including the variants of this *Bacillus* sp TY145 subtilase described in WO2015024739, and WO2016066757.

(e) protease having at least 90%, preferably at least 92% identity with the amino acid sequence of SEQ ID NO:85 from WO2016/205755 comprising at least one amino acid substitution (using the SEQ ID NO:85 numbering) selected from the group consisting of 1, 4, 9, 21, 24, 27, 36, 37, 39, 42, 43, 44, 47, 54, 55, 56, 74, 80, 85, 87, 99, 102, 114, 117, 119, 121, 126, 127, 128, 131, 143, 144, 158, 159, 160, 169, 182, 188, 190, 197, 198, 212, 224, 231, 232, 237, 242, 245, 246, 254, 255, 256, and 257, including the variants found in WO2016/205755 and WO2018/118950.

Especially preferred proteases for the detergent of the invention are:

(a) polypeptides demonstrating at least 90%, preferably at least 95%, more preferably at least 98%, even more preferably at least 99% and especially 100% identity with the wild-type enzyme from *Bacillus lentus*, comprising mutations in one or more, preferably two or more and more preferably three or more of the following positions, using the BPN' numbering system and amino acid abbreviations as illustrated in WO00/37627, which is incorporated herein by reference: V68A, N76D, N87S, S99D, S99AD, S99A, S101G, S101M, S103A, V104N/I, G118V, G118R, 5128L, P129Q, 5130A, Y167A, R1705, A194P, V205I, Q206L/D/E, Y209W and/or M222S. and/or (b) protease having at least 95%, more preferably at least 98%, even more preferably at least 99% and especially 100% identity with the amino acid sequence of SEQ ID NO:85 from WO2016/205755 comprising at least one amino acid substitution (using the SEQ ID NO:85 numbering) selected from the group comprising: P54E/G/I/L/Q/S/TN; S99A/E/H/I/K/M/N/Q/R/TN; S126A/D/E/F/G/H/I/L/M/N/Q/R/TN/Y; D127A/E/F/G/H/I/L/MN/P/Q/S/TN/W/Y; F128A/C/D/E/G/H/I/K/L/M/N/P/Q/R/S/T/W, A37T, S39E, A47V, T56Y, 180V, N85S, E87D, T114Q, and N242D;

Most preferably the additional protease is either selected from the group of proteases comprising the below mutations (BPN' numbering system) versus either the PB92 wild-type (SEQ ID NO:2 in WO 08/010925) or the subtilisin 309 wild-type (sequence as per PB92 backbone, except comprising a natural variation of N87S).

(i) G118V+S128L+P129Q+S130A
(ii) S101M+G118V+S128L+P129Q+S130A
(iii) N76D+N87R+G118R+S128L+P129Q+S130A+S188D+N248R
(iv) N76D+N87R+G118R+S128L+P129Q+S130A+S188D+V244R
(v) N76D+N87R+G118R+S128L+P129Q+S130A
(vi) V68A+N87S+S101G+V104N
(vii) S99AD or selected from the group of proteases comprising one or more, preferably two or more, preferably three or more, preferably four or more of the below mutations versus SEQ ID NO:1 from WO2018/118950:

P54T, S99M, S126A/G, D127E, F128C/D/E/G, A37T, S39E, A47V, T56Y, 180V, N85S, E87D, T114Q, and N242D.

Suitable commercially available additional protease enzymes include those sold under the trade names Alcalase®, Savinase®, Primase®, Durazym®, Polarzyme®, Kannase®, Liquanase®, Liquanase Ultra®, Savinase Ultra®, Savinase Evity®, Ovozyme®, Neutrase®, Everlase®, Coronase®, Blaze®, Blaze Ultra®, Blaze Evity® and Esperase® by Novozymes A/S (Denmark); those sold under the tradename Maxatase®, Maxacal®, Maxapem®, Properase®, Purafect®, Purafect Prime®, Purafect Ox®, FN3®, FN4®, Excellase®, Ultimase®, Extremase® and Purafect OXP® by Dupont; those sold under the tradename Opticlean® and Optimase® by Solvay Enzymes; and those available from Henkel/Kemira, namely BLAP (sequence shown in FIG. 29 of U.S. Pat. No. 5,352,604 with the following mutations S99D+S101 R+S103A+V104I+G159S, hereinafter referred to as BLAP), BLAP R (BLAP with S3T+V4I+V199M+V205I+L217D), BLAP X (BLAP with S3T+V4I+V205I) and BLAP F49 (BLAP with S3T+V4I+A194P+V199M+V205I+L217D); and KAP (*Bacillus alkalophilus* subtilisin with mutations A230V+S256G+S259N) from Kao.

Especially preferred for use herein are commercial proteases selected from the group consisting of Properase®, Blaze®, Blaze Evity®, Savinase Evity®, Extremase®, Ultimase®, Everlase®, Savinase®, Excellase®, Blaze Ultra®, BLAP and BLAP variants.

Preferred levels of protease in the product of the invention include from about 0.05 to about 20, more preferably from about 0.5 to about 10 and especially from about 1 to about 8 mg of active protease/g of composition.

Amylases

Preferably the composition of the invention may comprise an amylase. Suitable alpha-amylases include those of bacterial or fungal origin. Chemically or genetically modified mutants (variants) are included. A preferred alkaline alpha-amylase is derived from a strain of *Bacillus*, such as *Bacillus licheniformis, Bacillus amyloliquefaciens, Bacillus stearothermophilus, Bacillus subtilis*, or other *Bacillus* sp., such as *Bacillus* sp. NCBI 12289, NCBI 12512, NCBI 12513, DSM 9375 (U.S. Pat. No. 7,153,818) DSM 12368, DSMZ no. 12649, KSM AP1378 (WO 97/00324), KSM K36 or KSM K38 (EP 1,022,334). Preferred amylases include:

(a) variants described in WO 96/23873, WO00/60060, WO06/002643 and WO2017/192657, especially the variants with one or more substitutions in the following positions versus SEQ ID NO. 12 of WO06/002643:

26, 30, 33, 82, 37, 106, 118, 128, 133, 149, 150, 160, 178, 182, 186, 193, 202, 214, 231, 246, 256, 257, 258, 269, 270, 272, 283, 295, 296, 298, 299, 303, 304, 305, 311, 314, 315, 318, 319, 339, 345, 361, 378, 383, 419, 421, 437, 441, 444, 445, 446, 447, 450, 461, 471, 482, 484, preferably that also contain the deletions of D 183* and G184*.

(b) variants exhibiting at least 90% identity with SEQ ID No. 4 in WO06/002643, the wild-type enzyme from *Bacillus* SP722, especially variants with deletions in the 183 and 184 positions and variants described in WO 00/60060, WO2011/100410 and WO2013/003659 which are incorporated herein by reference.

(c) variants exhibiting at least 95% identity with the wild-type enzyme from *Bacillus* sp. 707 (SEQ ID NO:7 in U.S. Pat. No. 6,093,562), especially those comprising one or more of mutations in the following positions M202, M208, S255, R172, and/or M261. Preferably said amylase comprises one or more of M202L, M202V, M202S, M202T, M202I, M202Q, M202W, S255N and/or R172Q. Particularly preferred are those comprising the M202L or M202T mutations.

(d) variants described in WO 09/149130, preferably those exhibiting at least 90% identity with SEQ ID NO: 1 or SEQ ID NO: 2 in WO 09/149130, the wild-type enzyme from *Geobacillus* Stearophermophilus or a truncated version thereof.

(e) variants exhibiting at least 89% identity with SEQ ID NO:1 in WO2016091688, especially those comprising deletions at positions H183+G184 and additionally one or more mutations at positions 405, 421, 422 and/or 428.

(f) variants exhibiting at least 60% amino acid sequence identity with the "PcuAmyl a-amylase" from *Paenibacillus curdlanolyticus* YK9 (SEQ ID NO:3 in WO2014099523).

(g) variants exhibiting at least 60% amino acid sequence identity with the"CspAmy2 amylase" from Cytophaga sp. (SEQ ID NO:1 in WO2014164777).

(h) variants exhibiting at least 85% identity with AmyE from *Bacillus subtilis* (SEQ ID NO:1 in WO2009149271).

(i) variants exhibiting at least 90% identity with the wild-type amylase from *Bacillus* sp. KSM-K38 with accession number AB051102.

(j) variants exhibiting at least 80% identity with the mature amino acid sequence of AAI10 from *Bacillus* sp (SEQ ID NO:7 in WO2016180748), preferably comprising a mutation in one or more of the following positions modification in one or more positions 1, 54, 56, 72, 109, 113, 116, 134, 140, 159, 167, 169, 172, 173, 174, 181, 182, 183, 184, 189, 194, 195, 206, 255, 260, 262, 265, 284, 289, 304, 305, 347, 391, 395, 439, 469, 444, 473, 476, or 477

(k) variants exhibiting at least 80% identity with the mature amino acid sequence of the fusion peptide (SEQ ID NO:14 in US 2019/0169546), preferably comprising one or more of the mutations H1*, N54S+V56T, A60V, G109A, R116Q/H+W167F, L173V, A174S, Q172N, G182*, D183*, N195F, V206L/Y, V208L, K391A, K393A, I405L, A421H, A422P, A428T, G476K and/or G478K. Preferred amylases contain both the deletions G182* and G183* and optionally one or more of the following sets of mutations:

1. H1*+G109A+N195F+V206Y+K391A;
2. H1*+N54S+V56T+G109A+A1745+N195F+V206L+K391A+G476K)
3. H1*+N54S+V56T+A60V+G109A+R116Q+W167F+Q172N+L173V+A1745+N195F+V206L+1405L+A421H+A422P+A428T
4. H1*+N545+V56T+G109A+R116Q+A1745+N195F+V206L+1405L+A421H+A422P+A428T;
5. H1*+N545+V56T+G109A+R116H+A1745+N195F+V208L+K393A+G478K;

(l) variants exhibiting at least 80% identity with the mature amino acid sequence of *Alicyclobacillus* sp. amylase (SEQ ID NO:8 in WO2016180748)

The amylase can be an engineered enzyme, wherein one or more of the amino acids prone to bleach oxidation have been substituted by an amino acid less prone to oxidation. In particular it is preferred that methionine residues are substituted with any other amino acid. In particular it is preferred that the methionine most prone to oxidation is substituted. Preferably the methionine in a position equivalent to 202 in SEQ ID NO:2 is substituted. Preferably, the methionine at this position is substituted with threonine or leucine, preferably leucine.

Suitable commercially available alpha-amylases include DURAMYL®, LIQUEZYME®, TERMAMYL®, TERMAMYL ULTRA®, NATALASE®, SUPRAMYL®, STAINZYME®, STAINZYME PLUS®, FUNGAMYL®, ATLANTIC®, INTENSA® and BAN® (Novozymes A/S, Bagsvaerd, Denmark), KEMZYM® AT 9000 Biozym Biotech Trading GmbH Wehlistrasse 27b A-1200 Wien Austria, RAPIDASE®, PURASTAR®, ENZYSIZE®, OPTISIZE HT PLUS®, POWERASE®, PREFERENZ S® series (including PREFERENZ S1000® and PREFERENZ 52000® and PURASTAR OXAM® (DuPont, Palo Alto, Calif.) and KAM® (Kao, 14-10 Nihonbashi Kayabacho, 1-chome, Chuo-ku Tokyo 103-8210, Japan). In one aspect, suitable amylases include ATLANTIC®, STAINZYME®, POWERASE®, INTENSA® and STAINZYME PLUS®, ACHIEVE ALPHA® and mixtures thereof.

Preferably, the product of the invention comprises at least 0.01 mg, preferably from about 0.05 to about 10, more preferably from about 0.1 to about 6, especially from about 0.2 to about 5 mg of active amylase/g of composition.

Preferably, the protease and/or amylase of the composition of the invention are in the form of granulates, the granulates comprise more than 29% of sodium sulfate by weight of the granulate and/or the sodium sulfate and the active enzyme (protease and/or amylase) are in a weight ratio of between 3:1 and 100:1 or preferably between 4:1 and 30:1 or more preferably between 5:1 and 20:1.

Metal Care Agents

Metal care agents may prevent or reduce the tarnishing, corrosion or oxidation of metals, including aluminium, stainless steel and non-ferrous metals, such as silver and copper. Preferably the composition of the invention comprises from 0.1 to 5%, more preferably from 0.2 to 4% and especially from 0.3 to 3% by weight of the product of a metal care agent, preferably the metal care agent is benzo triazole (BTA).

Glass Care Agents

Glass care agents protect the appearance of glass items during the dishwashing process. Preferably the composition of the invention comprises from 0.1 to 5%, more preferably from 0.2 to 4% and specially from 0.3 to 3% by weight of the composition of a metal care agent, preferably the glass care agent is a zinc containing material, specially hydrozincite.

Cationic Polymer

The composition preferably comprises from 0.5 to 5%, preferably from 0.5 to 2% by weight of the composition of cationic polymer. The cationic polymer provides filming benefits. The cationic polymer comprises in copolymerized form from:

i. 60% to 99% by weight of the cationic polymer of at least one monoethylenically unsaturated polyalkylene oxide monomer of the formula I (monomer (A))

I

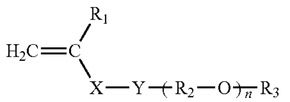

in which the variables have the following meanings:

X is —CH2- or —CO—, if Y is —O—;

X is —CO—, if Y is —NH—;

Y is —O— or —N14-;

R1 is hydrogen or methyl;

R2 are identical or different C2-C6-alkylene radicals;

R3 is H or C1-C4 alkyl;

n is an integer from 3 to 100, preferably from 15 to 60, ii. from 1 to 40% by weight of the cationic polymer of at least one quatemized nitrogen-containing monomer, selected from the group consisting of at least one of the monomers of the formula IIa to IId (monomer (B))

i. ))

IIa

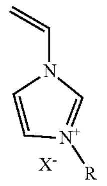

IIb

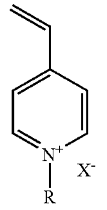

IIc

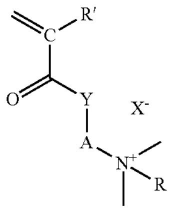

IId

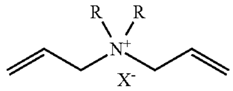

in which the variables have the following meanings:

R is C1-C4 alkyl or benzyl;

R' is hydrogen or methyl;

Y is —O— or —NH—;

A is C1-C6 alkylene;

X— is halide, C1-C4-alkyl sulfate, C1-C4-alkylsulfonate and C1-C4-alkyl carbonate.

iii. from 0 to 15% by weight of the cationic polymer of at least one anionic monoethylenically unsaturated monomer (monomer (C)), and iv. from 0 to 30% by weight of the cationic polymer of at least one other nonionic monoethylenically unsaturated monomer (monomer (D)), and the cationic polymer has a weight average molecular weight ($M_w$) from 2,000 to 500,000, preferably from 25,000 g/mol to 200,000 g/mol.

In preferred cationic polymers the variables of monomer (A) have the following meanings:

X is —CO—;

Y is —O—;

R1 is hydrogen or methyl;

R2 is ethylene, linear or branched propylene or mixtures thereof;

R3 is methyl;

n is an integer from 15 to 60.

Preferably, the cationic polymer comprises from 60 to 98% by weight of monomer (A) and from 1 to 39% by weight of monomer (B) and from 0.5 to 6% by weight of monomer (C).

In preferred cationic polymers monomer (A) is methylpolyethylene glycol (meth)acrylate and wherein monomer (B) is a salt of 3-methyl-1-vinylimidazolium.

Preferably, the cationic polymer comprises from 69 to 89% of monomer (A) and from 9 to 29% of monomer (B).

In preferred cationic polymers, the weight ratio of monomer (A) to monomer (B) is ≥2:1 and for the case where the copolymer comprises a monomer (C), the weight ratio of monomer (B) to monomer (C) is also ≥2:1, more preferably is ≥2.5:1 and preferably monomer (A) comprises methylpolyethylene glycol (meth)acrylate and monomer (B) comprises a salt of 3-methyl-1-vinylimidazolium.

A preferred composition according to the invention comprises:

a) from 10% to 40% by weight of the composition of MGDA, preferably the trisodium salt of methylglycine-N,N-diacetic acid;

b) optionally from 2% to 6% by weight of the composition of crystalline sodium silicate having a crystalline layered structure and the composition NaMSix O2x+1.y H2O, in which M denotes sodium or hydrogen, x is a number from 1.9 to 4 and y is a number from 0 to 20, preferably having the formula Na2Si2O5.

c) from 10% to 30% by weight of the composition of carbonate;

d) optionally from 1% to 6% by weight of the composition of HEDP;

e) from 2% to 6% by weight of the composition of a dispersant polymer, preferably a sulfonate polymer;

f) from 8% to 30% by weight of the composition of sodium percarbonate;

g) non-ionic surfactant;

h) amylase;

i) protease; and optionally j) glass and/or metal care agent.

Method of Automatic Dishwashing

The method of the invention comprises the step of subjecting tableware to the composition of the invention. The method provides very good cleaning of bleachable stains and enzymatic soils.

EXAMPLES

Example I

Four automatic dishwashing Compositions (Compositions A to D) were made and tested as detailed below.

I. Preparation of Test Compositions

Tests were carried out using the following detergent compositions. Material additions are shown at total raw material level. Unless stated otherwise, the raw materials are 100% active.

| | Composition A (Inventive) | | Composition B (Comparative) | | Composition C (Comparitive) | | Composition D (Inventive) | |
|---|---|---|---|---|---|---|---|---|
| | g | % | g | % | g | % | g | % |
| Sodium Carbonate | 1.50 | 8.21 | 1.50 | 7.89 | 1.50 | 7.89 | 1.50 | 8.22 |
| Sodium 1-hydroxyethylidene-1,1-diphosphonate (84.2% active) | 0.95 | 5.20 | 0.95 | 5.00 | 0.95 | 5.00 | 0.95 | 5.20 |
| Trilon ® M (78% active) | 6.72 | 36.86 | 6.72 | 35.38 | 6.72 | 35.39 | 6.72 | 36.86 |
| Tetraacetylethy lenediamine (92% active) | 0.00 | 0.00 | 0.76 | 4.00 | 0.76 | 4.00 | 0.00 | 0.00 |
| Acusol ™ 588GF (sulfonated polymer supplied by DowChemical) (93% active) | 0.78 | 4.27 | 0.78 | 4.10 | 0.78 | 4.10 | 0.78 | 4.27 |
| Amylase granule (4.2% active) | 0.29 | 1.57 | 0.29 | 1.50 | 0.29 | 1.50 | 0.29 | 1.57 |
| Protease granule (10% active) | 0.85 | 4.66 | 0.85 | 4.47 | 0.85 | 4.47 | 0.85 | 4.66 |
| Protease granule (8.1% active) | 0.23 | 1.26 | 0.23 | 1.21 | 0.23 | 1.21 | 0.23 | 1.26 |
| WeylClean ® MnTACN (98% active) | 0.003 | 0.017 | 0.003 | 0.016 | 0.00 | 0.00 | 0.00 | 0.00 |
| Sodium Percarbonate (13.4% AvO) | 3.49 | 19.17 | 3.49 | 18.40 | 3.49 | 18.40 | 3.49 | 19.17 |
| Plurafac ® SLF180 (non-ionic surfactant supplied by BASF) | 0.83 | 4.58 | 0.83 | 4.39 | 0.83 | 4.39 | 0.83 | 4.58 |
| Lutensol ® TO 7 (non-ionic surfactant supplied by BASF) | 0.89 | 4.90 | 0.89 | 4.70 | 0.89 | 4.70 | 0.89 | 4.90 |
| Benzotriazole | 0.008 | 0.043 | 0.008 | 0.042 | 0.008 | 0.042 | 0.008 | 0.043 |
| PEI600EO7 75% Quat | 0.40 | 2.19 | 0.40 | 2.10 | 0.40 | 2.10 | 0.40 | 2.19 |
| Processing Aids, fillers, minors & perfume | 1.29 | 7.08 | 1.29 | 6.80 | 1.29 | 6.80 | 1.29 | 7.08 |
| Total (one dose) | 18.23 | 100 | 18.99 | 100 | 18.99 | 100 | 18.23 | 100 |

II. Test Items

The following test items were used:

| Item | Description |
|---|---|
| Stained Teacups | Firma Schönwald white ceramic teacup, 98 L/0.19. Stained with tea, according to IKW method (Recommendations for the Quality Assessment of the Cleaning Performance of Dishwasher Detergents (Part B, Update 2015)). |
| Minced meat plates | Ceramic side plate, Arzberg form 2000, no. 10219, ø 19 cm Stained with minced meat, according to IKW method (Recommendations for the Quality Assessment of the Cleaning Performance of Dishwasher Detergents (Part B, Update 2015)). |
| Crème brûlée plates | Dessert plate, Arzberg, white, glazed porcelain, conforming with standard EN 50242, form 2000, no. 10219, ø 19 cm. Stained with crème brûlée according to the IKW method (Recommendations for the Quality Assessment of the Cleaning Performance of Dishwasher Detergents (Part B, Update 2015)). |
| CFT tiles | Centre for Testmaterials BV melamine tiles stained with the following: CFT Baked Light Cheese CFT Egg Yolk CFT Rice Starch CFT Mixed Starch |
| Additional Ballast Soil | Prepared according to the IKW method (Recommendations for the Quality Assessment of the Cleaning Performance of Dishwasher Detergents (Part B, Update 2015)). |

III. Test Wash Procedure

| | |
|---|---|
| Automatic Dishwasher: | Miele, model GSL2 |
| Wash volume: | 5000 mL |
| Water temperature: | 45° C. |
| Water hardness: | 20 gpg |
| Detergent addition: | Added into the bottom of the automatic dishwasher after the initial pre-wash is complete. |
| Positioning of test items: | 2× Ceramic Teacups on top rack Cleaning Tiles placed on top rack 2× 50 g pots of Additional ballast soil added to top rack at the start of the wash cycle. 5× Crème Brulee stained plate on bottom rack with unstained plate at front as ballast 6× Ceramic Side-plate stained with 3 g minced meat mixture |

Dishwashers were loaded with the items as detailed above which were washed using one dose of Compositions A to D. Four external replicates were completed for each test product following Latin square rotation of machines and products. The stained tiles were graded using an Image Analysis System to measure Stain Removal Index (SRI), where higher SRI removal is desired.

IV. Results

| | Results-Melamine Cleaning Tiles | | | |
|---|---|---|---|---|
| | CFT Baked Light Cheese | CFT Egg Yolk | CFT Rice Starch | CFT Mixed Starch |
| Composition A (Inventive) | 89.6BC | 98.1BCd | 82.9bC | 75.8BC |
| Composition B (Comparative) | 73.5 | 97 | 80.3 | 55.4 |
| Composition C (Comparative) | 73.9 | 96.9 | 79.5 | 61.8 |
| Composition D (Inventive) | 94.6ABC | 97.6bC | 83BC | 80.8BC |
| Tukey's HSD | 3.82 | 0.61 | 2.60 | 11.00 |

UPPER CASE letters indicate significant difference between treatments at alpha = 0.05 using Tukey's HSD.

Lower case letters indicate significant difference between treatments at alpha = 0.05 using Fisher's LSD UPPER CASE letters indicate significant difference between treatments at alpha=0.05 using Tukey's HSD. Lower case letters indicate significant difference between treatments at alpha=0.05 using Fisher's LSD As can be seen from the results above, compositions according to the invention provide higher levels of stain removal.

Example II

Two automatic dishwashing Compositions (Compositions E and F) were made and tested as detailed below.

I. Preparation of Test Compositions

Tests were carried out using the following detergent compositions. Material additions are shown at total raw material level. Unless stated otherwise, the raw materials are 100% active.

| | Composition E (Comparative) | | Composition F (Inventive) | |
|---|---|---|---|---|
| | g | % | g | % |
| Sodium Carbonate | 6.82 | 36.02 | 6.82 | 36.20 |
| Sodium 1-hydroxyethylidene-1,1-diphosphonate (84.2% active) | 0.17 | 0.90 | 0.17 | 0.90 |
| Sodium Sulfate | 2.80 | 14.79 | 2.80 | 14.86 |
| Trilon ® M (78% active) | 3.73 | 19.70 | 3.73 | 19.81 |
| Acusol ™ 588GF (sulfonated polymer supplied by DowChemical) (93% active) | 1.29 | 6.81 | 1.29 | 6.85 |
| Amylase granule (1.44% active) | 0.18 | 0.95 | 0.18 | 0.96 |
| Protease granule (8.1% active) | 0.12 | 0.65 | 0.12 | 0.66 |
| Cobalt Catalyst (PAAN) (2% active) | 0.100 (2 mg active) | 0.528 | 0.000 | 0.000 |
| WeylClean ® MnTACN (98% active) | 0.000 | 0.000 | 0.0021 (2 mg active) | 0.011 |

-continued

| | Composition E (Comparative) | | Composition F (Inventive) | |
|---|---|---|---|---|
| | g | % | g | % |
| Sodium Percarbonate (13.4% AvO) | 1.63 | 8.58 | 1.63 | 8.63 |
| PEI600EO7 75% Quat | 0.25 | 1.32 | 0.25 | 1.33 |
| Plurafac ® SLF180 (non-ionic surfactant supplied by BASF) | 1.17 | 6.18 | 1.17 | 6.21 |
| Dipropylene Glycol | 0.44 | 2.32 | 0.44 | 2.34 |
| Amine Oxide (32% active) | 0.16 | 0.83 | 0.16 | 0.83 |
| Glycerine | 0.08 | 0.42 | 0.08 | 0.43 |
| Total | 18.94 | 100 | 18.84 | 100 |

II. Test Items

The following test items were used:

| Item | Description |
|---|---|
| Stained Teacups | Firma Schönwald white ceramic teacup, 98 L/0.19. Stained with tea, according to IKW method (Recommendations for the Quality Assessment of the Cleaning Performance of Dishwasher Detergents (Part B, Update 2015)). |
| Minced meat plates | Ceramic side plate, Arzberg form 2000, no. 10219, ø 19 cm Stained with minced meat, according to IKW method (Recommendations for the Quality Assessment of the Cleaning Performance of Dishwasher Detergents (Part B, Update 2015)). |
| Crème brûlée plates | Dessert plate, Arzberg, white, glazed porcelain, conforming with standard EN 50242, form 2000, no. 10219, ø 19 cm. Stained with crème brûlée according to the IKW method (Recommendations for the Quality Assessment of the Cleaning Performance of Dishwasher Detergents (Part B, Update 2015)) |
| Additional Ballast Soil | Prepared according to the IKW method (Recommendations for the Quality Assessment of the Cleaning Performance of Dishwasher Detergents (Part B, Update 2015)). |

III. Test wash procedure

| | |
|---|---|
| Automatic Dishwasher: | Miele, model GSL2 |
| Wash volume: | 5000 ml |
| Water temperature: | 45° C. |
| Water hardness: | 20 gpg |
| Detergent addition: | Added into the bottom of the automatic dishwasher after the initial pre-wash is complete. |
| Positioning of test items: | 2× Ceramic Teacups on top rack 5× Crème Brulee stained plate on bottom rack with unstained plate at front as ballast 2× 50g pots of Additional ballast soil added to top rack at the start of the wash cycle. 6× Ceramic Side-plate stained with 3 g minced meat mixture |

Dishwashers were loaded with the items as detailed above which were washed using one dose of Composition E or F. Four external replicates were completed for each test product following Latin square rotation of machines and products. The teacups were visually graded according to the IKW method (Recommendations for the Quality Assessment of the Cleaning Performance of Dishwasher Detergents (Part B, Update 2015)), using a standard scale where higher soil removal is desired (maximum score is 10).

IV. Results

| | Teacup Grades | Standard Error |
|---|---|---|
| Composition E (Comparitive) | 2.92 | 0.21 |
| Composition F (Inventive) | 5.98 | 0.38 |

As can be seen from the results above, the composition according to the invention provides a higher level of stain removal.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An automatic dishwashing detergent composition comprising:

a) from about 0.5 wt % to about 5 wt % of a quaternized alkoxylated polyalkyleneimine comprising a polyalkyleneimine backbone, alkoxy chains and quaternization groups wherein the quaternized alkoxylated polyalkyleneimine has a degree of quaternization of from about 40% to about 98% and wherein:

i) the polyalkyleneimine backbone represents from about 1% to about 40% by weight of the quaternized alkoxylated polyalkyleneimine;

ii) the alkoxy chains represent from about 60% to about 99% by weight of the quaternized alkoxylated polyalkyleneimine, and wherein the alkoxy chains are selected from polyoxyethylene chains having an average of from about 1 to about 50 ethoxy units, polyoxypropylene chains having an average of from about 0 to about 30 propoxy units and mixtures thereof, and wherein said polyalkyleneimine backbone has a weight-average molecular weight of 600 to 5000 g/mol;

b) from about 5 wt % to about 25 wt % of percarbonate bleach;

c) from about 0.05 to about 10 mg of active amylase/g of the composition and from about 0.05 to about 20 mg of active protease/g of the composition; and wherein the composition is free of bleach activator and bleach catalyst, or wherein the composition is free of bleach activator and comprises manganese bleach catalyst.

2. A composition according to claim 1 further comprising a complexing agent.

3. A composition according to claim 1 wherein the composition is free of phosphate builder.

4. A composition according to claim 1 wherein the composition further comprises a dispersant polymer.

5. A composition according to claim 1 further comprising:

from about 0.5 to about 20% by weight of the composition of carbonate;

from about 0.5 to about 10% by weight of the composition of HEDP;

from about 5 to about 40% by weight of the composition of a complexing agent;

from about 1 to about 5% by weight of the composition of a dispersant agent;

from about 1 to about 10% by weight of the composition of a non-ionic surfactant; and wherein:

the percarbonate bleach comprises sodium percarbonate.

6. A composition according to claim 1 wherein the composition is in unit dose form.

7. A method of cleaning cookware/tableware in an automatic dishwashing machine comprising the step of subjecting the cookware/tableware to a washing liquor comprising the composition according to claim 1.

* * * * *